US008271691B2

(12) United States Patent
Ramo et al.

(10) Patent No.: US 8,271,691 B2
(45) Date of Patent: Sep. 18, 2012

(54) METHOD FOR COUPLING A TELEPHONE SWITCHED CIRCUIT NETWORK TO AN INTERNET PROTOCOL NETWORK

(75) Inventors: Frederic M. Ramo, Sophia-Antipolis (FR); Anne Rigault, Sophia-Antipolis (FR); Laurent M. Bollereau, Sophia-Antipolis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 951 days.

(21) Appl. No.: 11/798,853

(22) Filed: May 17, 2007

(65) Prior Publication Data
US 2007/0280220 A1 Dec. 6, 2007

(30) Foreign Application Priority Data

May 18, 2006 (EP) .................................. 06300494

(51) Int. Cl.
*H04J 3/12* (2006.01)
(52) U.S. Cl. ........................................ 709/249
(58) Field of Classification Search .......... 370/351–356, 370/389–429; 709/219, 223, 249
See application file for complete search history.

(56) References Cited

U.S. PATENT DOCUMENTS

| 2001/0055380 A1* | 12/2001 | Benedyk et al. ............. 379/219 |
| 2002/0143755 A1* | 10/2002 | Wynblatt et al. ................ 707/3 |
| 2003/0108067 A1* | 6/2003 | Craig et al. ................... 370/522 |
| 2004/0001517 A1* | 1/2004 | Lamberton et al. ........... 370/522 |
| 2005/0149940 A1* | 7/2005 | Calinescu et al. ............ 718/104 |
| 2006/0031506 A1* | 2/2006 | Redgate ....................... 709/226 |
| 2006/0045103 A1* | 3/2006 | Garnero et al. ............... 370/401 |
| 2006/0221982 A1* | 10/2006 | Bouckaert et al. ............ 370/401 |
| 2007/0005732 A1* | 1/2007 | Bankston et al. ............. 709/219 |
| 2007/0118632 A1* | 5/2007 | Harvey et al. ................ 709/223 |
| 2007/0140113 A1* | 6/2007 | Gemelos ...................... 370/229 |

FOREIGN PATENT DOCUMENTS

| EP | 1 503 553 | 2/2005 |
| WO | 03/017599 | 2/2003 |

OTHER PUBLICATIONS

EP Office Action dated Jul. 18, 2011 ~ Application No. 06300494.9.
Gradischnig K D et al ~ "Signaling transport over IP-based networks using IETF standards" ~ DRCN 2001 ~ Oct. 7, 2011 ~ pp. 1-7.
Website ~ "Cisco IP Transfer Point" ~ Jan. 1, 2002 ~ (no image available)URL:http://www.cisco.com/warp/public/cc/pd/witc/itp/prodlit/m3usg_wp.

* cited by examiner

*Primary Examiner* — Ian N Moore
*Assistant Examiner* — Thai Nguyen

(57) ABSTRACT

There is provided a method of coupling a telephone switched circuit network to an internet protocol network, wherein the telephone switched circuit network and the internet protocol network are interconnected by a gateway. The gateway comprises a non-routing key rule and the method comprises the step of generating a control method for a service by use of the non-routing key rule, wherein the service is located on the telephone switched circuit network and wherein the service is implemented by at least one application server, wherein the at least one application server is located on the internet protocol network and wherein the at least one application server is specified by an application server status. The method further comprises the step of sending the control message to a node, which is located on the telephone switched circuit network.

9 Claims, 2 Drawing Sheets

METHOD FOR COUPLING A TELEPHONE SWITCHED CIRCUIT NETWORK TO AN INTERNET PROTOCOL NETWORK

This application claims priority from European Patent Application 06300494.9, filed on May 18, 2006. The entire contents of the aforementioned application is incorporated herein by reference.

BACKGROUND AND PRIOR ART

It is a general tendency that the performance, availability, and reliability of networks based on the internet protocol, so-called internet protocol (IP) networks, is increasing. Similarly, telephone switched circuit networks (TSCN) have been developed and improved for many decades and telephone switched circuit networks work very reliably. Telephone switched circuit networks are commonly used to interconnect mobile and fixed telephones. As the number of users and their respective bandwidth requirements increase, it becomes necessary to increase the capability of telephone switched circuit networks. Expanding and maintaining telephone switched circuit networks requires however massive investments which could be saved to some extend if telephone services could be provided by IP networks. Telephone switched circuit network carriers are therefore willing to consolidate both, IP networks and telephone switched circuit networks.

In a telephone switched circuit network two types of data traffic are used: media data traffic and signalling data traffic. Both types of data traffic can be migrated separately from telephone switched circuit networks to IP networks because they rely on different technologies.

In most public telephone switched circuit networks the signalling data traffic is carried in a packet network which is referred to as Signalling System 7 network (SS7 network). The Internet Engineering Task Force (IETF) has initiated the SIGTRAN working group which defined open standards for transporting SS7 signalling data traffic over IP networks. The architecture that has been defined by the SIGTRAN working group consists of three components: a standard internet protocol, a common signalling transport protocol that supports a common set of reliable transport functions for signalling transport which is referred to as stream control transport protocol (SCTP), and an adaptation sub-layer that supports specific primitives, such as management indications that are required by a particular signalling application protocol.

One new adaptation sub-layer amongst others is the Signalling Connection Control Part (SCCP) user adaptation layer which is abbreviated as SUA layer. On the SUA layer a protocol is defined for the transport of any SCCP user signalling on the IP network. This protocol is called SUA protocol and defined by IETF.

For this protocol the IETF has defined two main entities, a signalling gateway and a SUA application server. The signalling gateway interconnects a SS7 network and an IP network. One or more SUA application servers are located on the IP network which can be requested by a SCCP user signalling on the SS7 network by via the signalling gateway. Alternatively, a SUA application server on the IP network can request a SCCP user signalling on the SS7 network by use of the signalling gateway. A SCCP user signalling is also referred to as SCCP service and a SUA application server is also referred to as application server.

A SCCP service in the SS7 network is declared by use of a point code (PC) and a subsystem number (SSN). On the SUA layer, an application server can be declared by a lot of characteristics, for example by a point code, a subsystem number, a global title (GT), a calling party address, or a mobile application part (MAP) parameter.

When a SCCP data message is received from a node of the SS7 network at the signalling gateway, the point code, subsystem number, and other parameters are extracted from the SCCP data message and a pattern matching is carried out on the SUA layer. From the pattern matching it is determined to which application server the SCCP message is routed to. The SUA routing mechanism is based on user defined matching rules. These matching rules are referred to as routing key rules and the routing key rules are comprised in a routing key file on the signalling gateway.

A SS7 node can send a subsystem test (SST) SCCP management message to the signalling gateway in order to request the availability of a service which is dispatched into one application server on the internet network. In response to a SST SCCP management message the signalling gateway sends a subsystem allowed (SSA) or a subsystem prohibited (SSP) SCCP management message depending on the status of the application server. A SSA SCCP message specifies the availability of an application server and a SSP management message specifies the unavailability of the application server.

Additionally the signalling gateway can inform a node by a SSP or a SSA SCCP management message that the status of the application server has changed.

However, a SCCP service on the SS7 network can be dispatched into several application servers on the internet network, whereof some might be available and some might be unavailable. For such complex scenarios, no satisfactory solution is available that allows for the determination of a control message which is to be sent in response to a SST SCCP management message or in response to a change of an application server status. An improved method and system of coupling a telephone switched circuit network to an internet protocol network is thus desirable.

SUMMARY OF THE INVENTION

In accordance with an embodiment of the invention, there is provided a method of coupling a telephone switched circuit network to an internet protocol network. The telephone switched circuit network and the internet protocol network are interconnected by a gateway. The gateway comprises a non-routing key rule and the method comprises the step of generating a control method for a service by use of the non-routing key rule, wherein the service is located on the telephone switched circuit network and wherein the service is implemented by at least one application server, wherein the at least one application server is located on the internet protocol network and wherein the at least one application server is specified by an application server status. The method further comprises the step of sending the control message to a node, which is located on the telephone switched circuit network.

In accordance with an embodiment of the invention, the control message is either a first or a second control message and the rules database comprises a non-routing key rule according to which either the first or the second control message is generated depending on the application server status.

In accordance with an embodiment of the invention, the application server status is either specified as available or unavailable.

In accordance with an embodiment of the invention, the method further comprises the step of receiving a control message request by which the control message for the service is requested.

In accordance with an embodiment of the invention, the control message is determined in response to a change of the application server status of the at least one application server.

Thus the generation of a control message, which is either a first control message or a second control message, is triggered by the reception of a control message request from a node of the telephone switched circuit network or by a change of the application server status of the at least one application server. The decision if the first or the second control message is generated depends on the specifications made in the non-routing key rule. The control message, e.g. the first or the second control message, is sent to the node of the SS7 network which requested the generation of the control message or to all nodes of the SS7 network. An advantage of the method in accordance with the invention is that the control message is generated by use of the non-routing key rule so that also for complex cases in which a service is implemented by more than one application serves whereof some are available and some are unavailable control messages can be generated in response to a control message request for the service or in response to a change of the status of one or more application servers.

In accordance with an embodiment of the invention, the service is implemented by only one application server and the generated control message reflects the application server status of the one application server.

In accordance with an embodiment of the invention, the rules database comprises further routing key rules and the non-routing key rule does not interact with or damage the routing key rules. The rules database is thus divided into two parts. The first part which comprises the routing key rules is used for routing of a SCCP data message. The second part is the part which comprises the non-routing key rule and which is employed for the generation of a SCCP management message in response to a control message request or to an application server change. A division of the rules database has the advantage that the non-routing key rule can be adjusted or even be disabled without affecting the routing of the SCCP management message.

In accordance with an embodiment of the invention, the service is implemented by at least two application servers and in the non-routing key rule certain application servers of the at least two application servers are specified to be mandatory for the service. The non-routing key rule is further specified so that the first control message is generated if the application server status of each of the mandatory application servers is available and so that a second control message is generated if the application server status of one of the mandatory application servers is unavailable.

In accordance with an embodiment of the invention, a service is implemented by at least two application servers, and in the non-routing key rule certain application servers of the at least two application servers are specified to be shared by the service, and the non-routing key rule is specified so that a first control message is generated if the application server status of at least one application server is available and so that a second control message is generated if all of the at least two application servers are unavailable.

In accordance with an embodiment of the invention, a service is implemented by at least two application servers, and in the non-routing key rule certain application servers of the at least two application servers are specified either to be mandatory or to be shared by use of regular expressions so that a first or a second control message is generated depending on the result of a computation of the regular expressions.

In accordance with an embodiment of the invention, the service is specified by a node number and a service number and the at least one application server which implements the service is specified by an application identifier, and the node number, the service number and the application identifier are comprised in the non-routing key rule.

In accordance with an embodiment of the invention, the service is implemented by at least two application servers and the node number, the service number and the application identifier of each of the at least two application servers are arranged within the non-routing key rule so that certain application servers from said at least two application servers are mandatory for the service so that a first control message is generated if all mandatory application servers are available.

In accordance with an embodiment of the invention, the telephone switched circuit network is a signalling system network, the gateway is a signalling gateway, the service is a signalling connection control part service, the control message is a signalling connection control part message, the first control message is a subsystem allowed signalling connection control part management message, the second control message is a subsystem prohibited signalling connection control part management message, the control message request is a subsystem test signalling connection control part management message, the at least one application server is a user adaptation layer application server, the node number is a point code, the service number is a subsystem number, the application identifier is a user adaptation layer server identifier, and the rules database is a routing key rules file.

In accordance with an embodiment of the invention, the telephone switched circuit network is a signalling system 7 network.

In another aspect the invention relates to a computer program product for coupling a telephone switched circuit network to an internet protocol network.

In another aspect the invention relates to an electronic apparatus for coupling a telephone switched circuit network to an internet protocol network.

In another aspect the invention relates to a gateway for coupling a telephone switched circuit network to an internet protocol network, wherein the internet protocol network and the telephone switched circuit network are interconnected by the gateway and wherein the gateway comprises a rules database which comprises a non-routing key rule.

BRIEF DESCRIPTION OF THE DRAWINGS

In the following preferred embodiments of the invention will be described in greater detail by way of example only making reference to the drawings in which.

DETAILED DESCRIPTION

Figure 1:
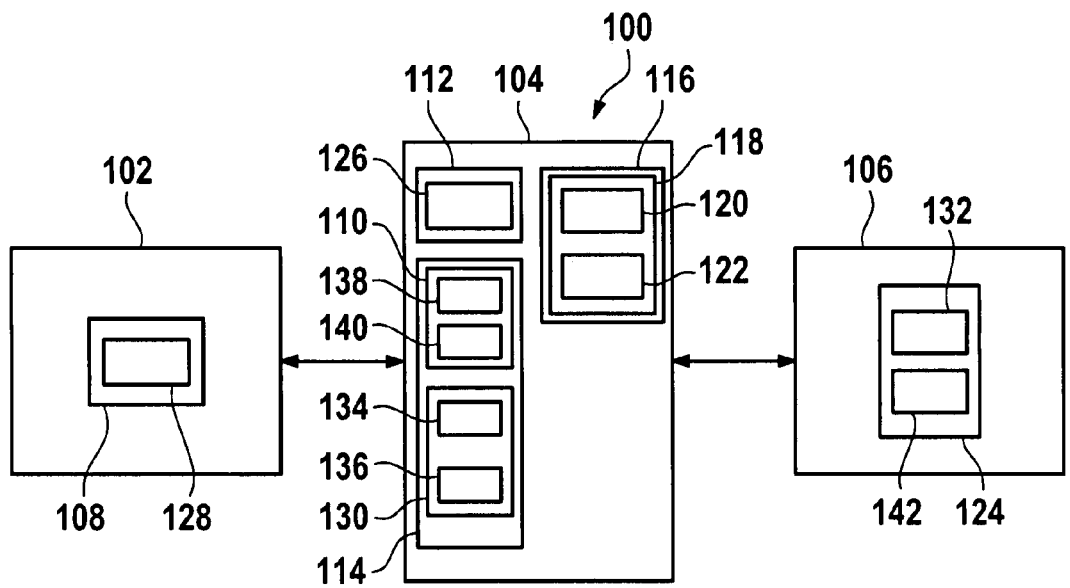
FIG. 1 shows a block diagram of a telephone switched circuit network connected by a gateway to an internet protocol network.

FIG. 1 shows a block diagram of a telephone switched circuit network 102 which is interconnected by a gateway 104 to an internet protocol network 106. The telephone switched circuit network 102 comprises at least one node 108. The gateway 104 comprises a microprocessor 112, a volatile memory device 114, and a non-volatile memory device 116. A rules database 118 is stored on the non-volatile memory device 116. The rules database 118 comprises routing-key rules 120 and a non-routing key rule 122. The microprocessor executes a computer program product 126. The IP network 106 comprises at least one application server 124.

A service 110 can be stored on the volatile memory device 114. The service links to an application server 124 on the internet protocol network 106. For this, the service comprises a node number 138 and a service number 140. The application server 124 comprises an application identifier 142. In the routing key rules 122 the application identifier 142 is assigned to the node number 138 and the service number 140. Thus the service 130 is routed to the application server 128 by use of the routing-key rules 120.

In operation, a control message request 128 is received from the node 108 by which the status of the service 110 is requested. The service is implemented on the internet protocol network 106 by the application server 124. The application server 124 is specified by an application server status 132 which is either available or unavailable.

The computer program product 126 executed by the microprocessor 112 comprises instructions to generate a control message 130, which is either a first control message 134 or a second control message 136 in accordance with the non-routing key rules and in accordance with the application server status 132 of the applications server 124. Thus in response to the reception of the control message request 128, the application server status 132 is determined by the microprocessor 112 and, depending if the application server status 132 is available or unavailable and depending on the non-routing key rule 122, a first control message 134 or a second control message 136 is generated and sent to the node 108.

Alternatively, the control message 130, which is either the first control message 134 or the second control message 136 is generated and sent to the node 108 in response to a change of the application server status 132, e.g. from available to unavailable or vice versa.

In an embodiment of the invention, the telephone switched circuit network 102 corresponds to a signalling system 7 (SS7), the gateway 104 corresponds to a signalling gateway (SG), the service 110 corresponds to a signalling connection control part (SCCP) service on the SS7 network side, the application server 124 corresponds to a SUA application server, the control message 130 is a SCCP management message in general and the first control message 134 is a subsystem allowed (SSA) SCCP management message and the second control message 136 is a subsystem prohibited (SSP) SCCP management message. The control message request 128 is further a subsystem test (SST) SCCP management message. The node number 138 and the service number 140 correspond further to a point code and to a subsystem number and the application identifier 142 corresponds to a SUA application server identifier through which the SUA application server is identified uniquely. The rules database 118 corresponds further to a routing key rules file in which the non-routing key rule 122 is not used for routing and does not disturb the routing provided by the routing key 120.

Figure 2:
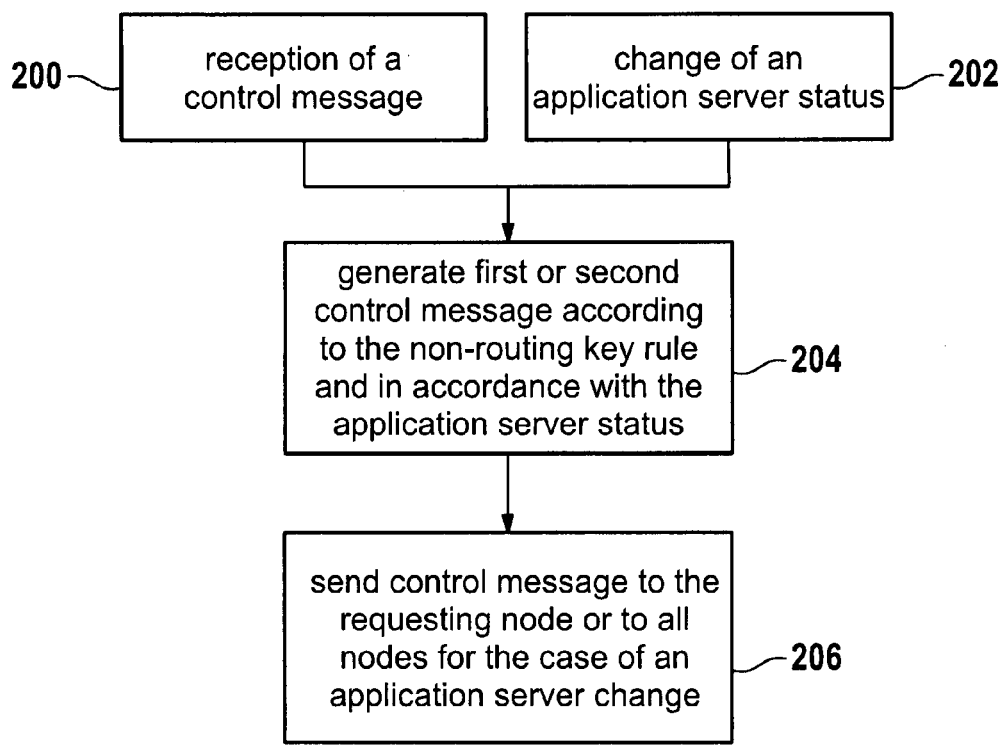
FIG. 2 depicts a flow diagram.

FIG. 2 depicts a flow diagram which can be employed to perform a method in accordance with the invention. In step 200 a control message request is received from a node of the telephone switched circuit network. The control message request is requesting the status of the service which is implemented by one or more application servers on the internet protocol. In step 204 a first or a second control message is generated depending on the settings specified in the non-routing key rules which will be discussed in more detail below and on the status of the application servers by which the service is implemented on the internet protocol network. The control message is sent to the requesting node in step 206.

Alternatively, the generation of a control message can be triggered by a change of the application server status as given in step 202. In response to a change of the application server status, a first or a second control message is generated in accordance with the non-routing key rule. The control message, which is either the first or the second control message, is sent in this case to all nodes of the telephone switched circuit network.

Figure 3:
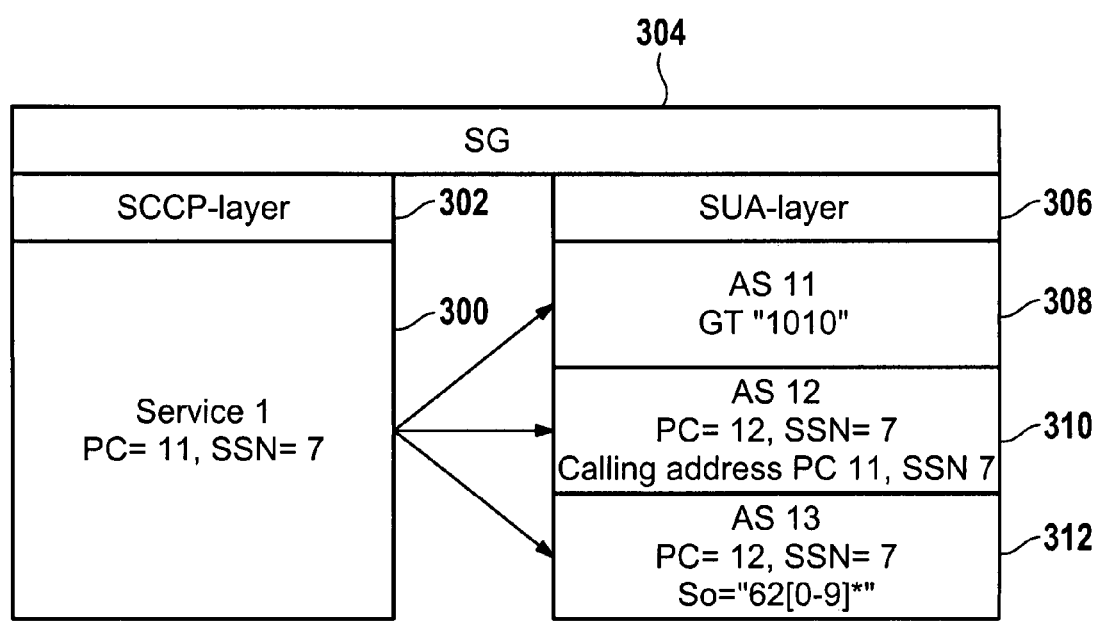
FIG. 3 depicts schematically and simplified the SCCP and SUA protocol layer of a signalling gateway.

FIG. 3 depicts schematically and simplified the SCCP and SUA protocol layer of a signalling gateway. The SCCP layer 302 is part of an SS7 network and the SUA layer 306 is part of the internet protocol network. The signalling gateway 304 or to be more precisely the NIF function (Nodal Interworking Function) provides the interconnection between the SCCP layer 302 and the SUA layer 306.

On the SCCP layer 302, a SCCP service 1 300 is specified by a point code (PC=11) and a subsystem number (SSN=7). The SCCP service 1 300 is implemented on the SUA layer 306 by three application servers AS11 308, AS12 310 and AS13 312. The SUA application server identifier for AS 11 308 is given by a global title GT "1010". The SUA application server identifier for AS 12 310 is given by the point code PC=12, the subsystem number SSN=7 and the calling address PC=11 and SSN=7. The SUA application server identifier for AS 13 is given by the point code PC=12, the subsystem number SSN=7, and by a specific MAP parameter So="62[0-9]*".

In the routing key rules file, the routing key is for example specified as follows:
igt='1010'; AS=11;
cgpa=(11/PC, 7/SSN); PC=12; SSN=7; AS=12;
PC=12; SSN=7; So="62[0-9]*"; AS=13;

The routing key is used to route the SCCP service 300 to the three application servers 308, 310, and 312.

The specific non-routing key rule, which is also comprised in the routing key rules file, for example after the routing key and which is not used for routing is for example given by the following instructions:
PC=12, SSN=7; AS=AS11, AS12, AS13; noroute;

In this example, the specific non-routing key rule causes the generation of a subsystem prohibited (SSP) management message if one of the application servers AS11 308, AS12 310 or AS13 312 is unavailable. If AS11 308, AS12 310, and AS13 312 are available, a subsystem allowed message (SSA) is generated in response to a received subsystem test SCCP message (SST) by which a node on the SS7 network is requesting the status of the SCCP service 300. Thus all application servers AS11 308, AS12 310, and AS13 312 are mandatory for the SCCP service request 300. Alternatively a SST message is sent to all nodes of a SS7 network if all three application servers AS11 308, AS 12 310, and AS 13 312 have been available and one application server changes its status from available to unavailable. For example AS 11 308 and AS 12 310 remain available and AS 13 312 changes is status from available to unavailable.

Another example of the specific non-routing key rule is given by the following instructions:
PC=12; SSN=7; AS=AS11 or AS12 or AS13; noroute;

This specific non-routing key rule causes the generation of a subsystem allowed SSA management message in response to a SST message received from a node of the SS7 network and which is requesting the status of the SCCP service 300 if at least one of the application servers AS11 308, AS12 310 or AS13 312 is available for the SCCP service request 300. If all three application servers are unavailable, a subsystem prohibited SCCP management message is generated in response to the SCCP service request 300. Another example of the specific non-routing key rule is given by the following instructions:

PC=12; SSN=7; AS={AS11, AS12 or AS13} or {AS12}; noroute;

This specific non-routing key rule causes the generation of a subsystem allowed SCCP management message if the application server AS11 308 and AS12 310 are available or if AS13 312 is available or alternatively only if AS12 310 is available. In all other cases a subsystem prohibited SCCP management message is generated.

The invention claimed is:

1. A method of coupling a telephone switched circuit network to an internet protocol network, said telephone switched circuit network and said internet protocol network being interconnected by a gateway, said gateway comprising a rules database, said rules database comprising a non-routing key rule, said method comprising the steps of:
   a) generating a control message for a service by use of said non-routing key rule, said service being located on said telephone switched circuit network, said service being implemented by at least one application server located on said internet protocol network, said at least one application server being specified by an application server status;
   wherein said service is implemented by at least two application servers, wherein in said non-routing key rule certain application servers of said at least two application servers are specified to be mandatory for said service, wherein said non-routing specified so that a first control message is generated if the application server status of each of said mandatory application servers is available and wherein said non-routing key rule is specified so that a second control message is generated if one application server status of one of said mandatory application servers is unavailable;
   b) sending said control message to at least one node, said at least one node being located on said telephone switched circuit network,
   wherein said non-routing key rule is configured to specify a plurality of application servers in various combinations that determine how the control message is generated, and
   c) sending said control message to all nodes located on said telephone switched circuit network if said application server status changes.

2. The method of claim 1, wherein said control message is either a first control message or a second control message, and wherein said rules database comprises non-routing key rules according to which either the first control message or the second control message is generated depending on the application server status.

3. The method of claim 1, wherein said application server status specifies either the availability or the unavailability of each of said at least one application server.

4. The method of claim 1, wherein said method further comprises the step of receiving a control message request from said node of said telephone switched circuit network, and wherein said control message request requests said control message for said service.

5. The method of claim 1, wherein said control message is generated in response to a change of said application server status of said at least one application server.

6. The method of claim 1, wherein the service is implemented by only one application server and wherein said control message is generated in accordance with the application server status of said one application server.

7. The method of claim 1, wherein said, rules database comprises further routing key rules and wherein said non-routing key rule does not interact with or damage said routing key rules.

8. The method of claim 1, wherein said service is implemented by at least two application servers, wherein said non-routing key rule certain application servers of said at least two application servers are specified to be shared by said service, wherein said non-routing key rule is specified so that said first control message is generated if the application server status of at least one application server is available and wherein said non-routing key rule is specified so that said second control message is generated if the application server status of all of said at least two application servers is unavailable.

9. An electronic apparatus for coupling a telephone switched circuit network to an internet protocol network, said telephone switched circuit network and said internet protocol network being interconnected by a gateway, said gateway comprising a rules database, said rules database comprising a non-routing key rule, said electronic apparatus comprising:
   a) means for generating a control message for a service by use of said non-routing key rule, said service being implemented by at least one application server, located on said internet protocol network, said at least one application server being specified by an application server status;
   wherein said service is implemented by at least two application servers, wherein in said non-routing key rule certain application servers of said at least two application servers are specified to be mandatory for said service, wherein said non-routing key rule is specified so that a first control message is generated if the application server status of each of said mandatory application servers is available and wherein said, non-routing key rule is specified so that a second control message is generated if one application server status of one of said mandatory application servers is unavailable;
   b) means for sending said control message to at least one node, said at least one node being located on said telephone switched circuit network,
   wherein said non-routing key rule is configured to specify a plurality of application servers in various combinations that determine how the control message is generated, and
   c) means for sending said control message to all nodes located on said telephone switched circuit network in response to a change of said application server status.

* * * * *

UNITED STATES PATENT AND TRADEMARK OFFICE
CERTIFICATE OF CORRECTION

PATENT NO. : 8,271,691 B2
APPLICATION NO. : 11/798853
DATED : September 18, 2012
INVENTOR(S) : Frederic M. Ramo et al.

It is certified that error appears in the above-identified patent and that said Letters Patent is hereby corrected as shown below:

In column 7, line 31, in Claim 1, after "non-routing" insert -- key rule is --.

In column 8, line 10, in Claim 7, delete "said," and insert -- said --, therefor.

In column 8, line 32, in Claim 9, delete "server," and insert -- server --, therefor.

In column 8, line 43, in Claim 9, delete "said," and insert -- said --, therefor.

Signed and Sealed this
Twenty-sixth Day of March, 2013

Teresa Stanek Rea
*Acting Director of the United States Patent and Trademark Office*